United States Patent
Otomo et al.

(10) Patent No.: US 10,898,806 B2
(45) Date of Patent: Jan. 26, 2021

(54) INFORMATION PROCESSING DEVICE FOR A GAME USING CHARACTER DATA AND INFORMATION PROCESSING

(71) Applicant: SEGA CORPORATION, Tokyo (JP)

(72) Inventors: Takahiro Otomo, Tokyo (JP); Kensuke Arai, Tokyo (JP); Hayato Hirai, Tokyo (JP)

(73) Assignee: SEGA CORPORATION, Tokyo (JP)

(*) Notice: Subject to any disclaimer, the term of this patent is extended or adjusted under 35 U.S.C. 154(b) by 0 days.

(21) Appl. No.: 15/942,011

(22) Filed: Mar. 30, 2018

(65) Prior Publication Data
US 2018/0221768 A1 Aug. 9, 2018

Related U.S. Application Data

(63) Continuation of application No. PCT/JP2017/006206, filed on Feb. 20, 2017.

(30) Foreign Application Priority Data

Mar. 1, 2016 (JP) ................... 2016-038500

(51) Int. Cl.
*A63F 13/58* (2014.01)
*A63F 13/53* (2014.01)
(Continued)

(52) U.S. Cl.
CPC .............. *A63F 13/53* (2014.09); *A63F 13/69* (2014.09); *A63F 13/77* (2014.09); *A63F 13/79* (2014.09); *A63F 13/825* (2014.09); *A63F 13/822* (2014.09)

(58) Field of Classification Search
CPC .... A63F 13/69; A63F 13/533; A63F 13/5375; A63F 13/825; A63F 13/422; A63F 13/45;
(Continued)

(56) References Cited

U.S. PATENT DOCUMENTS

2001/0039203 A1* 11/2001 Brown .................... A63F 13/10
463/16
2012/0238361 A1* 9/2012 Janis ....................... A63F 13/23
463/31
(Continued)

FOREIGN PATENT DOCUMENTS

JP 2015-139608 A 8/2015
JP 5869652 B1 2/2016

OTHER PUBLICATIONS onepiece-treasurecruise.com, "Powering Up Your Characters | One Piece Treasure Cruise Ultimate Strategy guide", Mar. 26, 2015, <https://web.archive.org/web/20150326012314/http://onepiece-treasurecruise.com/en/guide7/> (Year: 2015).*
(Continued)

*Primary Examiner* — Justin L Myhr
(74) *Attorney, Agent, or Firm* — Osha Bergman Watanabe & Burton LLP

(57) ABSTRACT

An information processing device includes a memory that stores character data of one or more first characters of a game and character data of one or more second characters owned by a user, a receiver that receives a game operation from the user, and a processor connected to the memory and the receiver. The processor updates character data of a third character selected from the one or more first characters, and outputs the updated character data to the memory. The processor extracts the same character as the third character from the one or more second characters based on reception of the game operation. The processor causes a display to display, to the user, a notification indicating that the character data of the same character has been updated.

6 Claims, 11 Drawing Sheets

(51) Int. Cl.
*A63F 13/69* (2014.01)
*A63F 13/79* (2014.01)
*A63F 13/825* (2014.01)
*A63F 13/77* (2014.01)
*A63F 13/822* (2014.01)

(58) Field of Classification Search
CPC ........ A63F 13/63; A63F 13/79; A63F 13/798; A63F 13/2145; A63F 13/30; A63F 13/426; A63F 13/53; A63F 13/537; A63F 13/67; A63F 13/77; A63F 13/822; A63F 2300/575
See application file for complete search history.

(56) References Cited

U.S. PATENT DOCUMENTS

| | | | | |
|---|---|---|---|---|
| 2013/0190080 | A1* | 7/2013 | Bibbey | G07F 17/3241 463/29 |
| 2015/0151204 | A1* | 6/2015 | Yamaguchi | A63F 13/825 463/31 |
| 2015/0157937 | A1* | 6/2015 | Yoda | A63F 13/35 463/42 |
| 2015/0224401 | A1* | 8/2015 | Honjo | A63F 13/825 463/23 |
| 2015/0314199 | A1* | 11/2015 | Chapman | G06F 8/71 463/42 |
| 2015/0336007 | A1* | 11/2015 | Ohashi | A63F 13/822 463/43 |

OTHER PUBLICATIONS

Pokemon wiki, "Evolution", Dec. 13, 2015, <https://pokemon.fandom.com/wiki/Evolution?oldid=742474> (Year: 2015).*
Office Action issued in corresponding Japanese Application No. 2016-184624 dated Sep. 12, 2017 (7 pages).
Office Action issued in corresponding Japanese Application No. 2016-038500 dated Jun. 14, 2016 (7 pages).
Capture Large Encyclopedia, The Supernatural Creature List, [online], uploaded Feb. 13, 2014, <http://punipuni.youkai-pedia.com/data/evolution/%e5%a6%96%e6%80%aa%e3%81%a8%e3%82%a2%e3%82%a4%e3%83%86%e3%83%a0%e3%82%92%e5%90%88%e6%88%90%e9%80%b2%e5%8c%96> (19 pages).
Kai-ri Sei Million Arthur and FAMI, App iPhone No. 024, Kadokawa-Dwango, Inc., p. 80-83, dated Jul. 9, 2015 (7 pages).
"[Puzzle Thorough Capture] 19th: Two attributes! Learn the ultimate evolution! [Must-see for beginners]", [online], Sep. 11, 2015, OCTOBA, [Search Mar. 18, 2020], Internet <URL: https://octoba.net/archives/20130422-android-feature-pad19.html> (6 pages).
"Puzzle & Dragons", Famitsu App iPhone No. 012, Kadokawa Co., Ltd., Jan. 2, 2014, vol. 012 (13 pages).
Notification of Reasons for Refusal issued in Japanese Patent Application No. 2018-119802, dated Mar. 31, 2020 (6 pages).

* cited by examiner

FIG. 6

| Character ID | Name | Rarity | Ability Parameters | Skills | Evolved Characters | Linked Characters | Ver. | ... |
|---|---|---|---|---|---|---|---|---|
| k001 | Character A | 1 | Attack 10, defense 10, HP 10 | Skill A | k101 | k101, k102 | 1.0 | ... |
| k002 | Character B | 2 | Attack 15, defense 15, HP 15 | Skill C | k102 | k002, k006, k007 | 1.0 | ... |
| k003 | Character C | 3 | Attack 20, defense 20, HP 20 | Skills E and F | - | - | 1.0 | ... |
| k004 | Character D | 4 | Attack 25, defense 25, HP 25 | Skills B and S | k104 | k012, k023 | 2.0 | ... |
|  |  |  |  |  | k204 | k017, k056, k097 |  |  |
| ... | ... | ... | ... | ... | ... | ... | ... | ... |

FIG. 7

| User ID | Name | Rank | Possessed Characters | Friends | Party | ... |
|---------|------|------|----------------------|---------|-------|-----|
| 0001 | User A | 59 | k051, ... | 0023, ... | k051, ... | ... |
| 0002 | User B | 25 | k005, ... | 0068, ... | k005, ... | ... |
| 0003 | User C | 7 | k099, ... | 0097, ... | k099, ... | ... |
| ... | ... | ... | ... | ... | ... | ... |

| Quest ID | Name | Earnable characters | Enemy characters | | ... |
|---|---|---|---|---|---|
| q001 | Quest 1 | Character A | Boss | Character T | ... |
| | | Character B | Sub | Character S | ... |
| | | ... | ... | ... | ... |
| q002 | Quest 2 | Character C | Boss | Character C | ... |
| | | Character D | Sub | Character D | ... |
| | | ... | ... | ... | ... |
| ... | ... | ... | ... | ... | ... |

INFORMATION PROCESSING DEVICE FOR A GAME USING CHARACTER DATA AND INFORMATION PROCESSING

BACKGROUND

Technical Field

The present invention generally relates to an information processing device and an information processing method.

Related Art

There are known information processing devices that execute information processes related to a game where character information in which character data configured for each character is stored, and characters configured in the character information are earned by users (Patent Literature 1, for example).

Patent Literature 1: JP-A 2015-139608

Recent years have seen games designed so that the character data of characters configured in character information is successively updated so that players can continue to play the game without becoming bored.

However, the user was unable to ascertain the particulars of character data updates, such as which character data was updated for which character. This meant that the user had to access strategy sites or the like on the Internet and investigate details about character data updates.

SUMMARY

One or more embodiments of the present invention allow a user to easily ascertain the particulars of character data updates.

One or more embodiments of the present invention provide an information processing device including a character information storage component for storing character information in which updatable character data has been configured for each character, a user information storage component for storing user information in which user data indicating characters possessed by a user has been configured, and a notification component for extracting a same character as a certain character from among the characters possessed by the user when the user performs a game operation after the character data for the certain character has been updated, and sending the user a notification that the character data has been updated for the extracted same character.

With this information processing device, the user can perform a game operation and thereby easily ascertain that character data for characters possessed by the user has been updated.

In one or more embodiments of the present invention, character data indicating pre-linked characters for each character has been configured in an updatable manner in the character information. The notification component extracts, in addition to the same character, a linked character from among the characters possessed by the user after the certain character has been updated, and sends the user a notification about the link between the extracted characters.

This makes it possible for the user to easily ascertain that he possesses a character linked with a character whose data has been updated, by performing a game operation.

One or more embodiments of the present invention provide an information processing device including a character information storage component for storing character information in which character data indicating pre-linked characters for each character has been configured in an updatable manner, a user information storage component for storing user information in which user data indicating characters possessed by a user has been configured, and a notification component for extracting a linked character from among the characters possessed by the user after a certain character has been updated when the user performs a game operation after the character data for the certain character has been updated, and sending the user a notification about the link between the extracted character and the certain character.

With the information processing device, the user can perform a game operation and thereby easily ascertain that a character he possesses has been linked with a character whose data has been updated.

In one or more embodiments of the present invention, the notification component sends a notification about game events that can earn a linked character after the certain character has been updated when the linked character could not be extracted from among the characters possessed by the user after the certain character has been updated.

This allows the user to easily ascertain game events that can earn a character even when the user does not possess a character that has been linked with a character whose data has been updated.

One or more embodiments of the present invention provide an information processing device including a character information storage component for storing character information in which character data indicating pre-linked characters for each character has been configured in an updatable manner, a user information storage component for storing user information in which user data indicating characters possessed by a user has been configured, a granting component for granting the user one or more characters selected from among a plurality of characters, and a notification component for, when the user is granted another character after the character data for a certain character has been updated, extracting a linked character from among the characters possessed by the user that is the same as the certain character after the same character as the granted other character has been updated, and sending the user a notification about the link between the extracted character and the granted other character.

With this information processing device, another character can be granted to the user and the user can easily ascertain the link between the granted other character and his own character whose data has been updated.

One or more embodiments of the present invention provide an information processing device including a character information storage component for storing character information in which character data indicating pre-linked characters for each character has been configured in an updatable manner, a user information storage component for storing user information in which user data indicating characters possessed by a user has been configured, a quest information storage component for storing quest information in which characters that can be earned have been configured for each quest, and a notification component for, when the user performs an operation to specify a quest after the character data for a certain character has been updated, extracting a linked character from among the characters possessed by the user that is the same as the certain character after the character that can be earned with the specified quest has been updated, and sending the user a notification about the link between the extracted character and the character that can be earned with the specified quest.

With this information processing device, the user can specify a quest and thereby easily ascertain the link between a character that can be earned with a specified quest and his own character whose data has been updated.

One or more embodiments of the present invention provide an information processing device including a character information storage component for storing character information in which character data indicating series characters that belong to the same series as each character has been configured in an updatable manner, a user information storage component for storing user information in which user data indicating characters possessed by a user has been configured, and a notification component for, when the user performs a game operation after the addition of a new series character for which the character data for a certain character has been updated, extracting a character from among the characters possessed by the user that is the same as the existing series character of the certain character, and sending the user a notification about the link between the extracted same character, the added new series character, and the certain character.

With this information processing device, the user can perform a game operation and thereby easily ascertain that character data has been updated and that a series character of the same series as his own character has been added.

One or more embodiments of the present invention provide a program for causing a computer to function as character information storage means for storing character information in which updatable character data has been configured for each character, user information storage means for storing user information in which user data indicating characters possessed by a user has been configured, and notification means for extracting a same character as a certain character from among the characters possessed by the user when the user performs a game operation after the character data for the certain character has been updated, and sending the user a notification that the character data has been updated for the extracted same character.

With this program, the user can perform a game operation and thereby easily ascertain that the character data has been updated for a character possessed by the user.

One or more embodiments of the present invention provide a program for causing a computer to function as character information storage means for storing character information in which character data indicating pre-linked characters for each character has been configured in an updatable manner, user information storage means for storing user information in which user data indicating characters possessed by a user has been configured, and notification means for extracting a linked character from among the characters possessed by the user after a certain character has been updated when the user performs a game operation after the character data for the certain character has been updated, and sending the user a notification about the link between the extracted character and the certain character.

With this program, the user can perform a game operation and thereby easily ascertain that a character he possesses has been linked with a character whose data has been updated.

One or more embodiments of the present invention provide a program for causing a computer to function as character information storage means for storing character information in which character data indicating pre-linked characters for each character has been configured in an updatable manner, user information storage means for storing user information in which user data indicating characters possessed by a user has been configured, granting means for granting the user one or more characters selected from among a plurality of characters, and notification means for, when the user is granted another character after the character data for a certain character has been updated, extracting a linked character from among the characters possessed by the user that is the same as the certain character after the same character as the granted other character has been updated, and sending the user a notification about the link between the extracted character and the granted other character.

With this program, another character can be granted to the user and the user can easily ascertain the link between the granted other character and his own character whose data has been updated.

One or more embodiments of the present invention provide a program for causing a computer to function as character information storage means for storing character information in which character data indicating pre-linked characters for each character has been configured in an updatable manner, user information storage means for storing user information in which user data indicating characters possessed by a user has been configured, quest information storage means for storing quest information in which characters that can be earned have been configured for each quest, and notification means for, when the user performs an operation to specify a quest after the character data for a certain character has been updated, extracting a linked character from among the characters possessed by the user that is the same as the certain character after the character that can be earned with the specified quest has been updated, and sending the user a notification about the link between the extracted character and the character that can be earned with the specified quest.

With this program, the user can specify a quest and thereby easily ascertain the link between a character that can be earned with a specified quest and his own character whose data has been updated.

One or more embodiments of the present invention provide a program for causing a computer to function as character information storage means for storing character information in which character data indicating series characters that belong to the same series as each character has been configured in an updatable manner, user information storage means for storing user information in which user data indicating characters possessed by a user has been configured, and notification means for, when the user performs a game operation after the addition of a new series character for which the character data for a certain character has been updated, extracting a character from among the characters possessed by the user that is the same as the existing series character of the certain character, and sending the user a notification about the link between the extracted same character, the added new series character, and the certain character.

With this program, the user can perform a game operation and thereby easily ascertain that character data has been updated and that a series character of the same series as his own character has been added.

One or more embodiments of the present invention provide an information processing device including a memory that stores character data of one or more first characters of a game and character data of one or more second characters owned by a user, a receiver that receives a game operation from the user, and a processor connected to the memory and the receiver. The processor updates character data of a third character selected from the one or more first characters, and outputs the updated character data to the memory. The processor extracts the same character as the third character from the one or more second characters based on reception of the game operation. The processor causes a display to display, to the user, a notification indicating that the character data of the same character has been updated.

According to one or more embodiments of the present invention, users can easily ascertain the particulars of character data updates.

BRIEF DESCRIPTION OF DRAWINGS

FIG. 6 is a configuration diagram showing an example of character information according to one or more embodiments of the present invention.

FIG. 7 is a configuration diagram showing an example of user information according to one or more embodiments of the present invention.

DETAILED DESCRIPTION

Embodiments of the present invention will be described below in detail with reference to the drawings. However, embodiments of the present invention described below are nothing but an example, and are not intended to exclude the application of various modifications or techniques not specifically expressed below. That is, embodiments of the present invention can be modified in various ways without departing from the gist thereof. Also, in the discussion of the drawings below, portions that are the same or similar will be assigned the same or similar reference signs. The drawings are simplified, and do not necessarily match the actual dimensions, proportions, and so forth. From one drawing to the next, there may be portions in which the dimensional relations and proportions are not the same.

An information processing device, a processing method, and an information processing system according to one or more embodiments of the present invention will now be described in detail. The embodiments can be widely applied to information processing devices, processing methods, information processing systems, etc., that make use of a game in which character data is updated.

System Configuration

Figure 1:
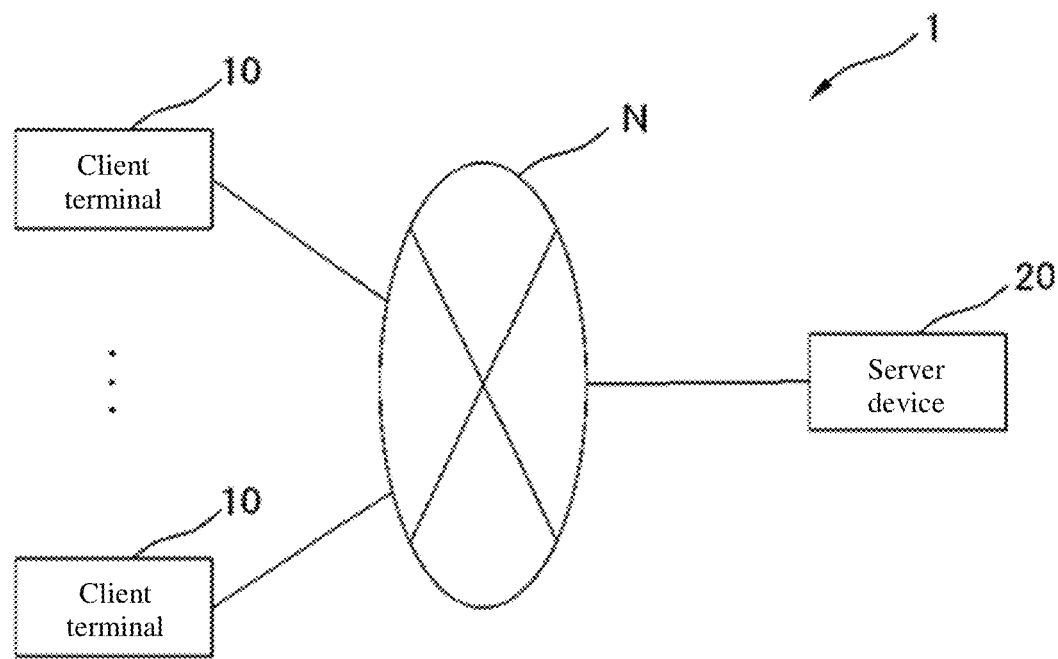
FIG. 1 is a configuration diagram showing an example of an information processing system according to one or more embodiments of the present invention.

FIG. 1 is a configuration diagram showing an example of the information processing system 1 according to one or more embodiments. As shown in FIG. 1, in the information processing system 1 according to one or more embodiments, one or more client terminals 10 and a server device 20 are connected via a network N.

The client terminals 10 are terminal devices such as a PC, a smartphone, or a tablet operated by a user, or are terminal devices such as dedicated game devices for home or commercial use. The server device 20 manages and controls a game played by the users on the client terminals 10, performs billing processing within the game, and so forth. The network N is the Internet or the like, and includes a mobile wireless base station and the like.

One or more embodiments of the present invention can be applied to a client/server type of information processing system 1 as shown in FIG. 1, as well as to a single game device by additionally providing some way to perform billing processing within the game. It should go without saying that the information processing system 1 in FIG. 1 is just an example, and that various system configurations are possible depending on the application and purpose. For instance, the server device 20 in FIG. 1 may be configured to be distributed among a plurality of computers.

Hardware Configuration

Client Terminals and Server Device

Figure 2:
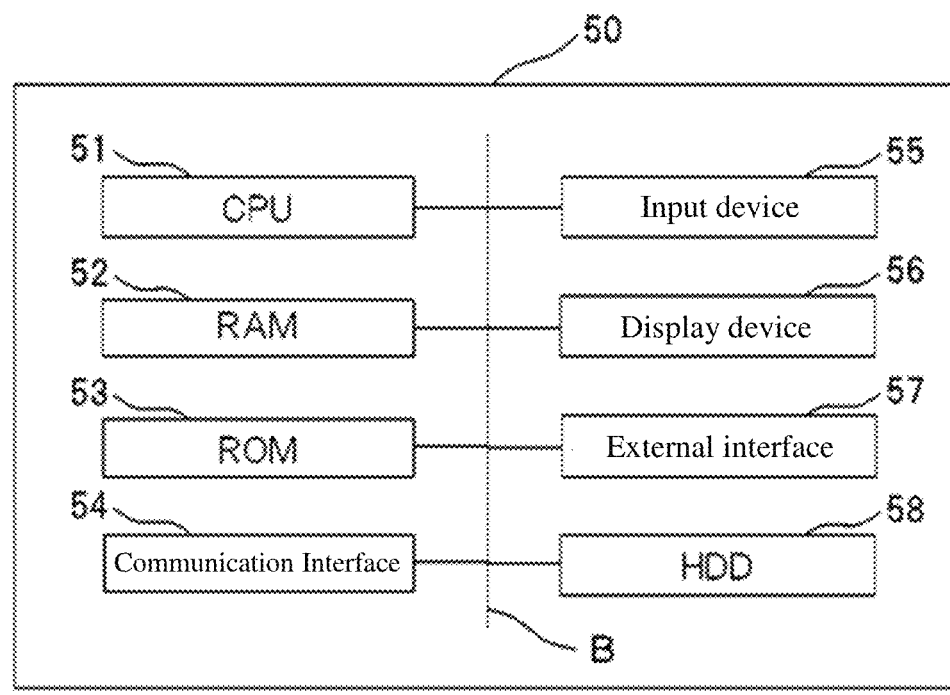
FIG. 2 is a hardware configuration diagram showing an example of a computer according to one or more embodiments of the present invention.

FIG. 2 is a hardware configuration diagram showing an example of the computer 50 according to one or more embodiments. The client terminals 10 and the server device 20 according to one or more embodiments are realized by the computer 50 having the hardware configuration shown in FIG. 2, for example. The computer 50 is an example of an information processing device.

As shown in FIG. 2, the computer 50 includes a CPU 51, a RAM 52, a ROM 53, a communication interface 54, an input device 55, a display device 56, an external interface 57, an HDD 58, and the like, all of which are connected together by bus line B. The input device 55 and the display device 56 may be configured so that they are connected and used only when necessary.

The CPU 51 is an arithmetic apparatus that reads programs and data from a storage device such as the ROM 53 and the HDD 58 to the RAM 52, and executes various kinds of processing based on the read program and data, so as to realize the control and functions of the entire computer.

The RAM 52 is an example of a volatile semiconductor memory (storage device) for temporarily holding programs and data, and is also used as a work area when the CPU 51 executes various processing.

The ROM 53 is an example of a nonvolatile semiconductor memory (storage device) that can hold programs and data even when the power is switched off. The ROM 53 stores programs and data such as network settings, and BIOS and OS settings executed when the computer 50 is started up.

The communication interface 54 is an interface for connecting the computer 50 to the network N. This allows the computer 50 to perform data communication via the communication interface 54.

The input device 55 is a device used by a user or an administrator to input various signals. The input device 55 is, for example, a touch panel, operation keys or buttons, a keyboard or a mouse, or another such operation device.

The display device 56 is a device for displaying various kinds of information on the screen to a user or a manager. The display device 56 is, for example, a display such as liquid crystal or organic EL.

The external interface 57 is an interface for connecting so as to enable data communication with an external device. This allows the computer 50 to read from and/or write to a recording medium via the external interface 57. The external device is, for example, a recording medium such as a flexible disk, a CD, a DVD, an SD memory card, a USB memory, or the like.

The HDD 58 is an example of a nonvolatile storage device that stores programs and data. The programs and data that are stored include an OS which is basic software for controlling the entire computer, and applications that provide various functions in the OS.

A drive device (such as a solid state drive: SSD) using a flash memory as a storage medium may be used instead of the HDD 58.

The client terminals 10 and the server device 20 according to one or more embodiments can realize various kinds of processing (discussed below) by executing a program in the computer 50 having the hardware configuration described above.

Software Configuration
Server Device

Figure 3:
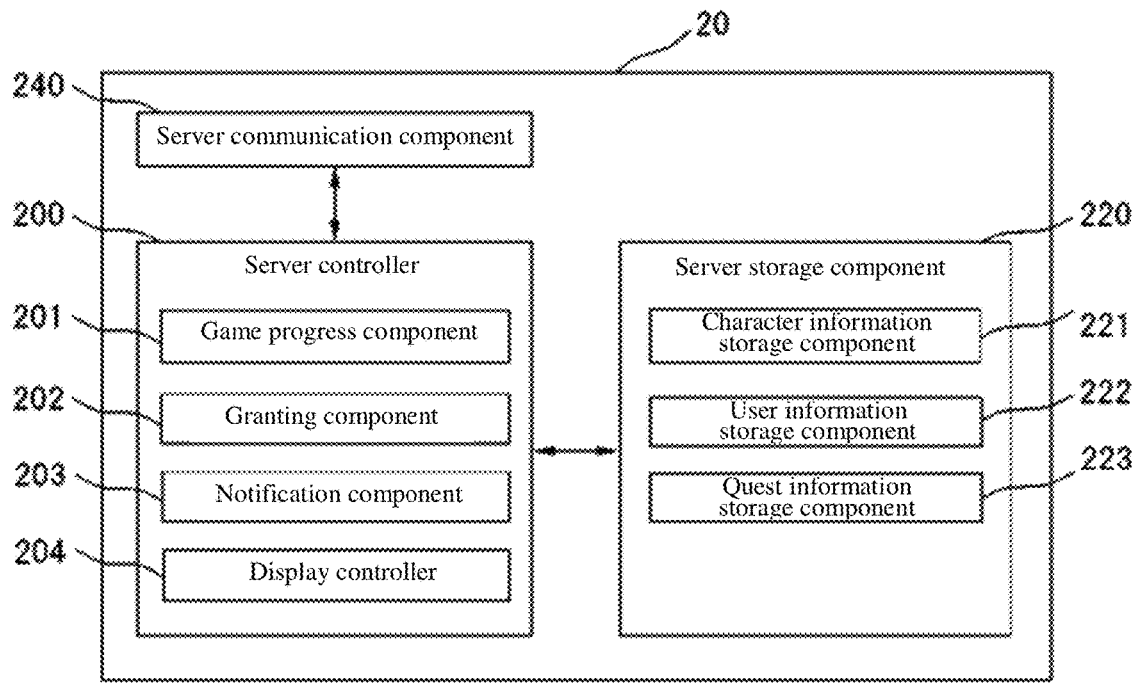
FIG. 3 is a functional block diagram showing an example of a server device according to one or more embodiments of the present invention.

FIG. 3 is a functional block diagram showing an example of the server device 20 according to one or more embodiments. The server device 20 according to one or more embodiments is realized by the functional blocks shown in FIG. 3, for example.

The server device 20 according to one or more embodiments realizes a server controller 200, a server storage component 220, and a server communication component 240 by executing a program.

The server controller 200 has a function of executing processing related to various games. This server controller 200 includes a game progress component 201, a granting component 202, a notification component 203, and a display controller 204.

The game progress component 201 controls the progress of various games such as battle games, lottery games, and fusion games (discussed below) on the basis of a game operation accepted from the user by the client terminal 10. For example, the game operation from the user is received by a receiver of the server device 20.

In battle games and lottery games, the granting component 202 grants the user one or more characters out of the plurality of characters configured in the character information (discussed below). The granting component 202 adds character data of one or more characters (fifth characters) selected from the plurality of characters configured in the character information.

The notification component 203 notifies the user that the character data for the character configured in the character information (discussed below) has been updated when the user performs a game operation or the like. For example, the notification component 203 causes a display of the client terminal 10 to display a notification indicating that the updated character data.

The display controller 204 controls the display of the screen of the client terminal 10 according to the progress of the battle game, lottery game, fusion game, etc., under the game progress component 201, for example.

The server storage component 220 has a function of storing information related to various kinds of games. The server storage component 220 includes a character information storage component 221, a user information storage component 222, and a quest information storage component 223.

The character information storage component 221 stores character information related to characters. The character information includes character data of one or more characters (first characters) of a game. Various characters and the like used in battle games, lottery games, and fusion games (as an example of character data) are configured in an updatable manner in the character information stored by the character information storage component 221. The character data configured in the character information is updated by performing a version upgrade of the game.

The user information storage component 222 stores user information related to the user. The user information includes character data of one or more characters (second characters) owned by a user. The ranking of the user, the various characters possessed by the user, and the like (as an example of user data) are configured in the user information stored by the user information storage component 222.

The quest information storage component 223 stores quest information related to quests. The various characters and the like that can be earned in a quest (as an example of quest data) are configured in the quest information stored by the quest information storage component 223.

The server communication component 240 has a function of communicating with the client terminals 10 via the network N.

Client Terminals

Figure 4:
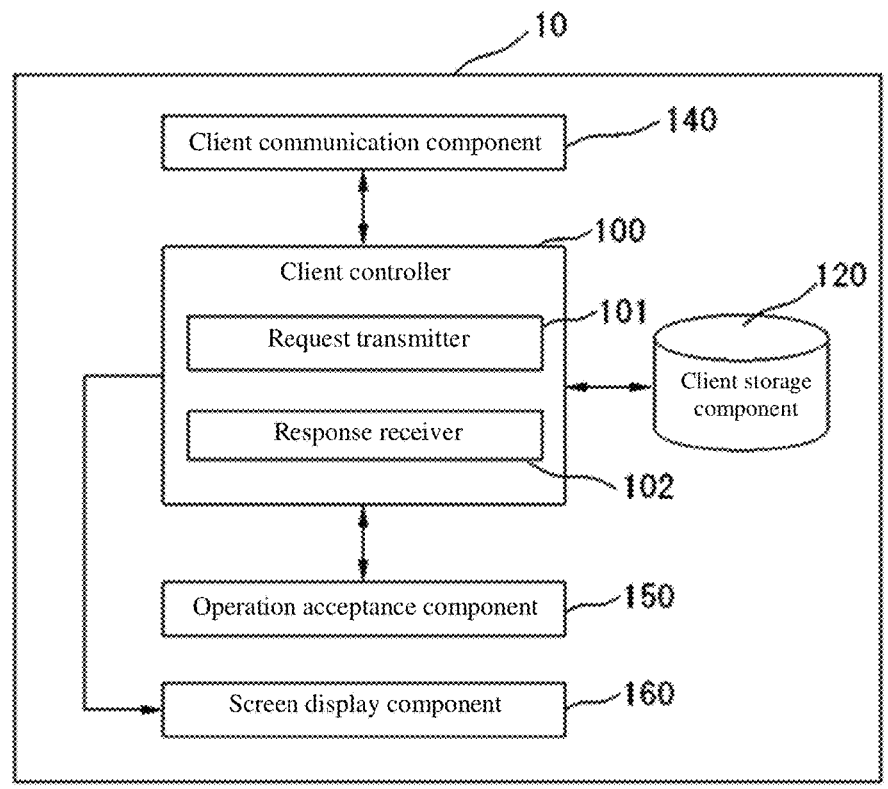
FIG. 4 is a functional block diagram showing an example of a client terminal according to one or more embodiments of the present invention.

FIG. 4 is a functional block diagram showing an example of a client terminal 10 according to one or more embodiments. The client terminal 10 according to one or more embodiments is realized by the functional blocks shown in FIG. 4, for example.

The client terminal 10 according to one or more embodiments executes a program to realize a client controller 100, a client storage component 120, a client communication component 140, an operation acceptance component 150, and a screen display component 160 (display). The client controller 100 includes a request transmitter 101 and a response receiver 102.

The operation acceptance component 150 accepts an operation from a user operating the client terminal 10. Also, the client controller 100 performs processing related to the game in the client terminal 10. The request transmitter 101 transmits a request to the server device 20 based on the particulars of the operation accepted from the user by the operation acceptance component 150. The response receiver 102 receives a response, such as a processing result, to a request transmitted by the request transmitter 101 to the server device 20.

Further, the client storage component 120 stores information that is necessary in the client terminal 10. The client communication component 140 communicates with the server device 20. The screen display component 160 displays the screen of the client terminal 10 under control from the server device 20.

As described above, with the information processing system 1 according to one or more embodiments, the server device 20 performs game progress and display control, but this control may be performed by the client terminals 10. More specifically, the configuration may be such that the game progress component and/or the display controller is/are not provided to the server controller 200 of the server device 20, but is provided to the client controller 100 of the client terminals 10.

Also, the client controller 100 of the client terminals 10 may be a browser type that receives page data written in HTML (Hyper Text Markup Language), scripts included in the page data, and the like from the server device 20, and performs processing relating to the game. The client controller 100 of the client terminals 10 may also be an application type that performs processing relating to the game on the basis of an installed application.

Game Summary

Here, a summary of the games in one or more embodiments will now be given. The games in one or more embodiments include at least battle games, lottery games, and fusion games.

In one or more embodiments, a battle game is a game in which enemy characters appear against a party made up of a plurality of characters, and the various characters that make up the party do battle with the appearing enemy characters.

In a battle game, a plurality of quests is set up, according to the degree of difficulty, for the purpose of defeating the enemy characters. The user can form a party using his own characters, etc., select one of the quests, and engage in battle with the enemy characters.

As a result of this battle, the user may be granted a character if a quest is cleared by defeating the enemy characters. The user can also use the granted character to perform a fusion game.

A lottery game in one or more embodiments is a game in which, when a user operation to execute a character lottery is accepted, a character selected from a character group subject to the lottery on the basis of lottery conditions is granted to the user. The user can use the granted character to play a battle game or a fusion game.

A fusion game in one or more embodiments is a game in which, when a user operation to execute a character fusion is accepted, the character serving as the base (base character) is combined with the character serving as the raw material (raw material character), and the ability of the base character is strengthened (strengthening fusion), or the base character is grown to the next stage and evolved into another character (evolved character) (evolution fusion).

The user selects the base character and the raw material character from among the characters he possesses, and performs strengthening fusion and evolution fusion. With strengthening fusion, instead of having the raw material character taken away from the user, the ability of the base character the user still possesses can be improved, or a new skill can be added. With evolution fusion, instead of having all the linked characters taken away from the user, the use of all the characters that are pre-linked with the base character (linked characters) as raw material characters allows the user to possess an evolved character that was grown from the base character.

Character Data Updates

With the game in one or more embodiments, when a version is upgraded by an administrator's operation, the character data for the characters (third character) configured in the character information is updated. This version upgrade adds a new kind of character, or adds a skill or an evolved character for an existing character, for example.

In one or more embodiments, a notification of the particulars of character data updates related to the characters possessed by the user is sent to match the timing at which the user performs a game operation, the timing at which the user has earned a character, or the timing at which the user has specified a quest.

Consequently, the user can easily ascertain how the character data has been updated for which character, from among the characters possessed by the user.

Notification Upon Game Operation

Figure 5:
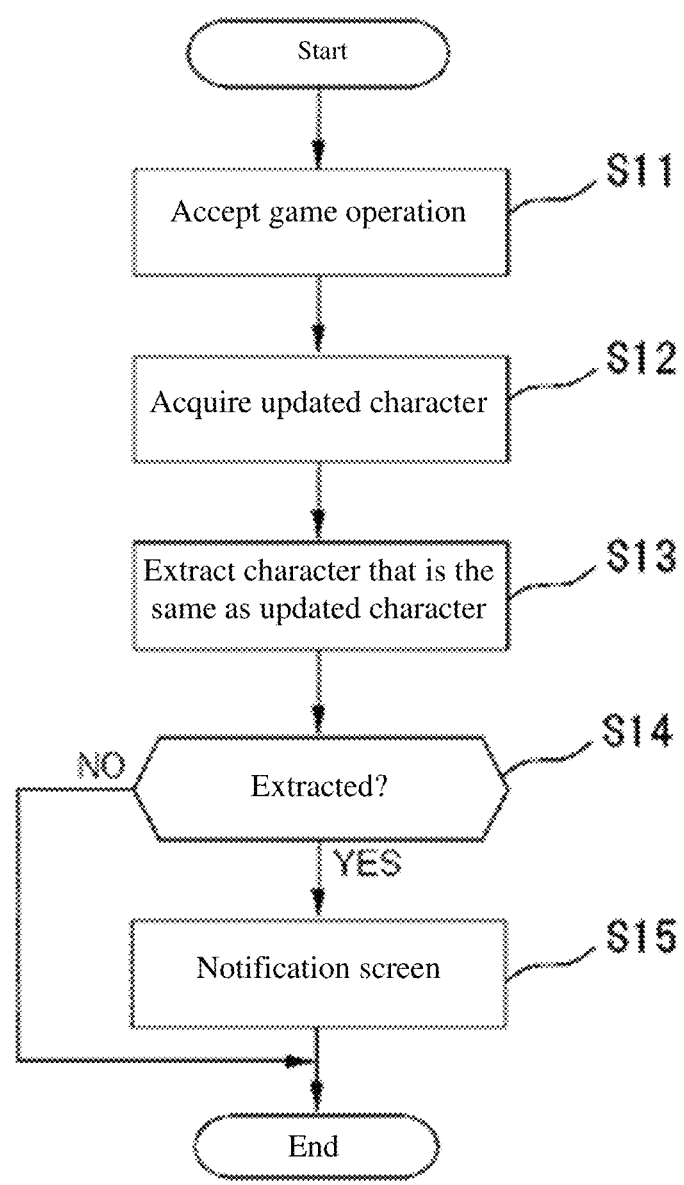
FIG. 5 is a flowchart illustrating notification processing upon a game operation in the information processing system according to one or more embodiments of the present invention.

FIG. 5 is a flowchart illustrating the notification processing upon a game operation in the information processing system 1 according to one or more embodiments.

After the character data has been updated for a character configured in the character information via a version upgrade, the user performs a game operation on the client terminal 10 when a specific game screen is displayed on the screen display component 160 of the client terminal 10.

More specifically, the user performs an operation for starting the game on the client terminal 10 when the initial screen is displayed on the screen display component 160 of the client terminal 10.

Also, the user performs an operation for evolution fusion on the client terminal 10 when a menu screen is displayed on the screen display component 160 of the client terminal 10.

If the user performs a game operation when a specific game screen is thus being displayed, the operation acceptance component 150 of the client terminal 10 accepts the operation particulars based on the game operation by the user (step S11).

The request transmitter 101 of the client terminal 10 makes a request to the server device 20 on the basis of the operation particulars accepted by the operation acceptance component 150 from the user.

The game progress component 201 of the server device 20 accepts the operation particulars from the client terminal 10, and requests that the notification component 203 execute the notification processing upon a game operation.

Next, when the execution of notification processing upon a game operation is requested by the game progress component 201, the notification component 203 of the server device 20 refers to the character information stored by the character information storage component 221, and acquires a character whose character data has been updated (updated character) via the current version upgrade, on the basis of the latest update version (step S12).

FIG. 6 is a configuration diagram showing an example of character information. The character information shown in FIG. 6 includes such items as character ID, name, rarity, ability parameters, skills, evolved characters, linked characters, and update version (Ver.).

Character ID is information for uniquely identifying a character. Name is information indicating a character name. Rarity is information indicating the scarcity value of a character. Here, rarity is set to one of a plurality of levels (such as level five).

Ability parameters is information indicating the ability of a character. Here, attack, defense, HP, and other such ability values are set. Skill is information indicating a special skill that can be brought into play. Skills can be activated by using a special character as a raw material character in strengthening fusion.

Evolved characters indicates that a character has undergone evolution. Here, it is also possible to configure two or more types of evolved characters for one character. In this case, each evolved character will be a character of the same series (series character) since the character to be evolved is the same character.

Linked characters (fourth character) indicates characters that have previously been linked with an evolved character. A linked character is a raw material character required for evolution fusion. Update version (Ver.) is information indicating the number of the revision.

Returning to FIG. 5, the notification component 203 of server device 20 then refers to the character information and to the user information stored by the user information storage component 222, and extracts a character that is the same as the updated character acquired by processing in step S12 above from among the characters possessed by the user (step S13).

In the processing in step S13, if there is a character that is the same as the linked character of an updated character, it is also extracted from among the characters possessed by the user, rather than extracting only the character that is the same as the acquired updated character.

FIG. 7 is a configuration diagram showing an example of user information. The user information shown in FIG. 7 includes such items as user ID, name, rank, possessed characters, friends, party, and so forth.

"User ID" is information for uniquely identifying a user. Name is information indicating the user name. "Rank" is information indicating the game level of the user.

"Possessed characters" is information indicating the various characters possessed by the user. "Friends" is information indicating users in a friend relationship. "Party" is information indicating the characters constituting the party/group of the user.

Returning to FIG. 5, the notification component 203 of the server device 20 then determines whether or not a character that is the same as the updated character could be extracted from among the characters possessed by the user (step S14).

If the result of this determination is that a character that is the same as the updated character could not be extracted from among the characters possessed by the user, this processing is ended. On the other hand, if a character that is the same as the updated character could be extracted from among the characters possessed by the user, the processing proceeds to the next step S15.

Next, if the determination in the processing in step S14 is affirmative, the notification component 203 of the server device 20 sends the user a notification that the character data has been updated for the character possessed by the user (step S15).

Figure 8:
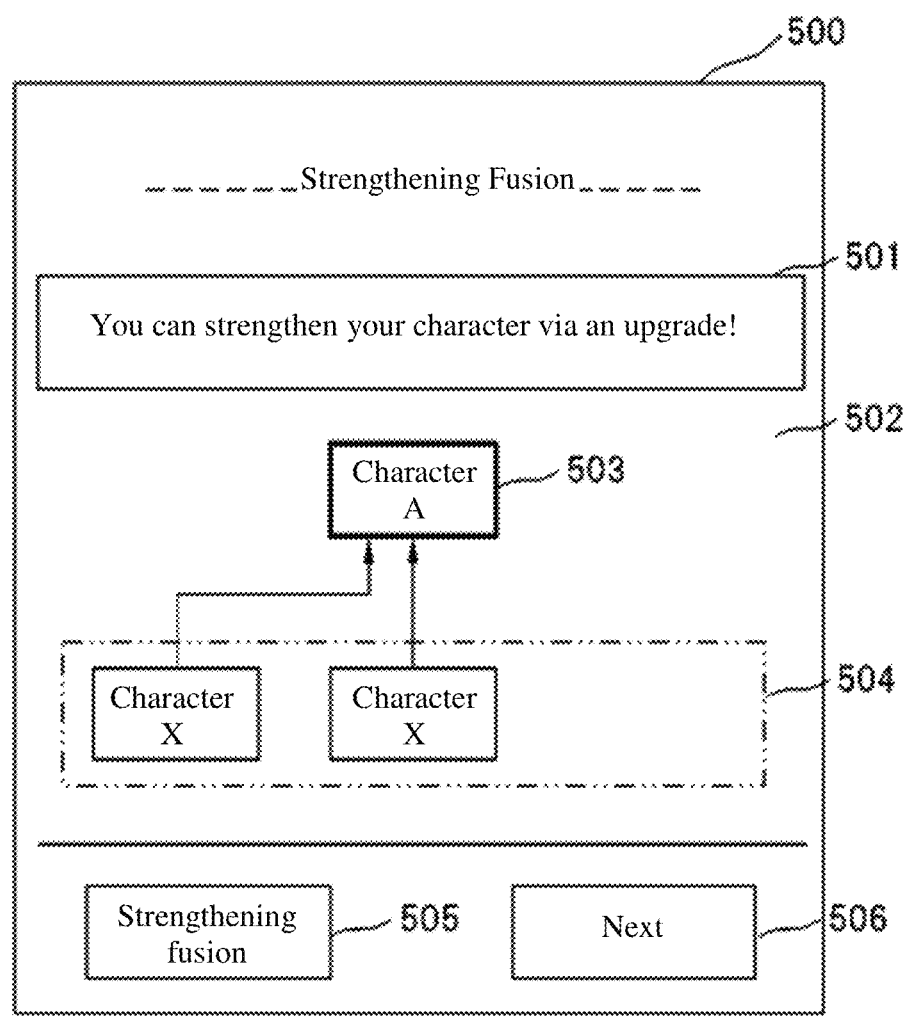
FIG. 8 is a simulation diagram showing an example of a notification screen upon a game operation according to one or more embodiments of the present invention.
Figure 9:
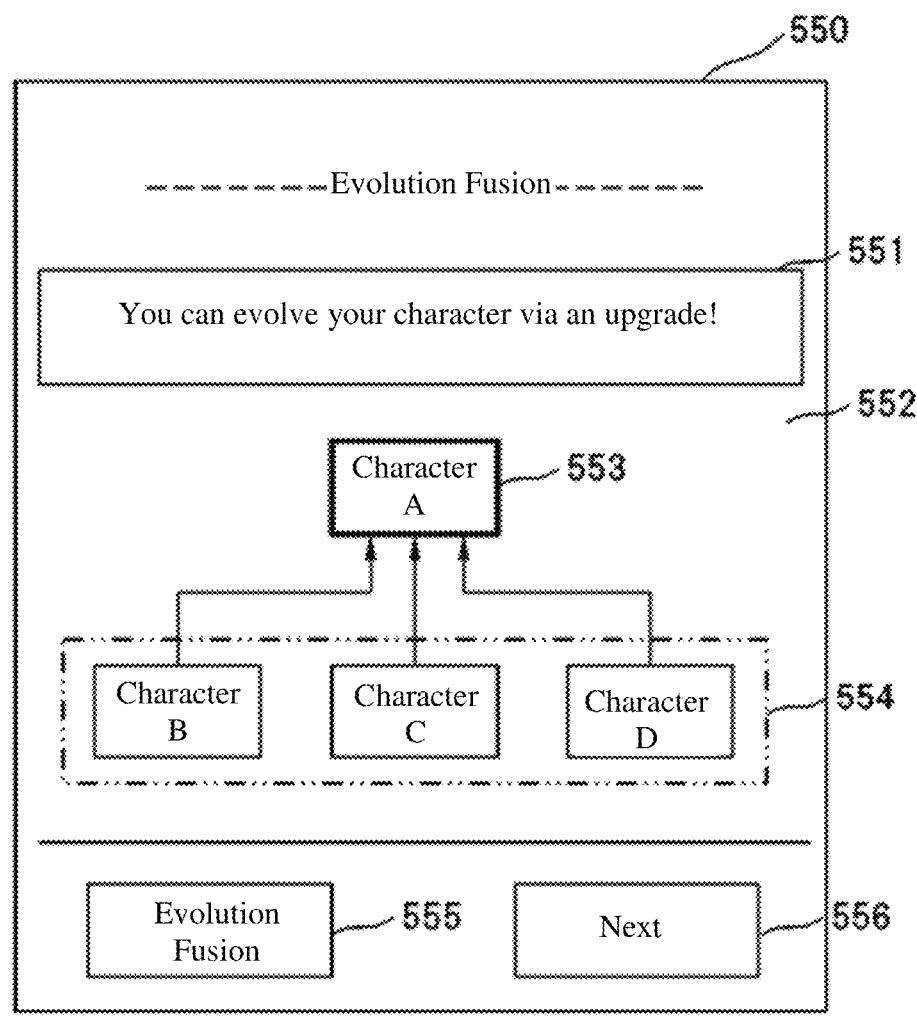
FIG. 9 is a simulation diagram showing another example of the notification screen upon a game operation according to one or more embodiments of the present invention.

In one or more embodiments, a notification is sent by a notification screen as shown in FIGS. 8 and 9. Accordingly, when the notification component 203 requests the execution of screen display control, the display controller 204 performs control to display a notification screen on the screen display component 160 of the client terminal 10.

FIG. 8 is a simulation diagram showing an example of a notification screen upon a game operation. This notification screen 500 is displayed when the user has performed an operation for starting the game on the initial screen after a "skill" (character data for a certain character) has been added by updating.

As shown in FIG. 8, the notification screen 500 displays a notification content display area 501, a character display area 502, a base character display area 503 for displaying a base character, a raw material character display area 504 for displaying a raw material character, an operation button 505, and an operation button 506. Details such as the type or effect of the added "skill" may also be displayed in the notification content display area 501.

Notification content based on the update of the character data is displayed in the notification content display area 501. Here, it is shown that, of the characters possessed by the user, a character that is the same as the updated character can be strengthened as a result of a "skill" (character data) having been added to the character information.

That is, on this notification screen 500, the user is notified that data has been updated for the same character extracted in the processing in step S13.

The character display area 502 is an area for sending a notification about the link between characters based on the update of the character data, and includes the base character display area 503 and the raw material character display area 504.

Here, of the characters possessed by the user, a character that is the same as the updated character ("character A") is displayed in the base character display area 503. Then, of the characters possessed by the user, a special character for allowing an added "skill" to be activated ("character X") is displayed in the raw material character display area 504.

That is, on the notification screen 500, the user is notified about the link between an updated character and a special character extracted in the processing in step S13.

In the raw material character display area 504, if the user does not possess a special character, the display of "character X" (special character) is grayed out.

The operation button 505 is a button for performing strengthening fusion of a base character displayed in the base character display area 503, using the raw material character displayed in the raw material character display area 504.

Here, when the user has selected the operation button 505, a fusion game is executed and a "skill" that has been added for "character A" (base character) can be activated by combining "character A" (base character) with "character X" (special character) that is the raw material character.

The operation button 506 is a button for switching the display content in the character display area 502. When a plurality of updated characters have been acquired in the processing in step S12 and a plurality of characters that are the same as these updated characters have been extracted in the processing in step S13, then if "skills" have been added by data update, the character displayed in the base character display area 503 can be switched every time the user presses the operation button 506.

FIG. 9 is a simulation diagram showing another example of the notification screen upon a game operation. This notification screen 550 is displayed when the user has performed an operation for evolution fusion on the menu screen after an "evolved character" (character data of a certain character) has been added by update.

As shown in FIG. 9, a notification content display area 551, a character display area 552, a base character display area 553, a raw material character display area 554, an operation button 555, and an operation button 556 are displayed on the notification screen 550.

In the notification content display area 551 it is displayed that, of the characters possessed by the user, a character that is the same as the updated character can be evolved as a result of an "evolved character" (character data) having been added to the character information. A button related to "evolved character" may be displayed in the notification content display area 551, and an operation from the user may result in switching to a screen that allows the parameter details for this "evolved character" to be confirmed.

That is, on this notification screen 550, the user is also notified that the data has been updated for the same character extracted in the processing in step S13.

The character display area 552 is an area where notification is sent about the link between characters based on the update of character data, and includes the base character display area 553 and the raw material character display area 554.

Here, of the characters possessed by the user, a character that is the same as the updated character ("character A") is displayed in the base character display area 553. Of the characters possessed by the user, linked characters ("character B," "character C," and "character D") that have been linked with the updated character after updating are displayed in the raw material character display area 554.

That is, on the notification screen 550, the user is notified about the link between the updated character and the linked characters extracted in the processing in step S13.

If the user does not possess any linked characters, the display of those linked characters is grayed in the raw material character display area 554.

The operation button 555 is a button for performing evolution fusion on the base character displayed in the base character display area 553, using the raw material character displayed in the raw material character display area 554.

Here, when the operation button 555 is pressed by the user, a fusion game is executed, and "character A" (base character) changes to the "evolved character" added by update, by combining the "character A" (base character) with all of "character B," "character C," and "character D" (raw material characters).

The display of the operation button 555 is grayed out, and the button cannot be operated by the user, if the user does not possess any linked characters.

The operation button 556 is a button for switching the display content in the character display area 552. When a plurality of updated characters have been acquired in the processing in step S12 and a plurality of characters that are the same as those updated characters have been extracted in the processing in step S13, then if "evolved characters" have been added by data update, the combination of the base character displayed in the base character display area 553 and the linked character displayed in the raw material character display area 554 can be switched every time the user presses the operation button 556.

Notification Upon Quest Specification

Figure 10:
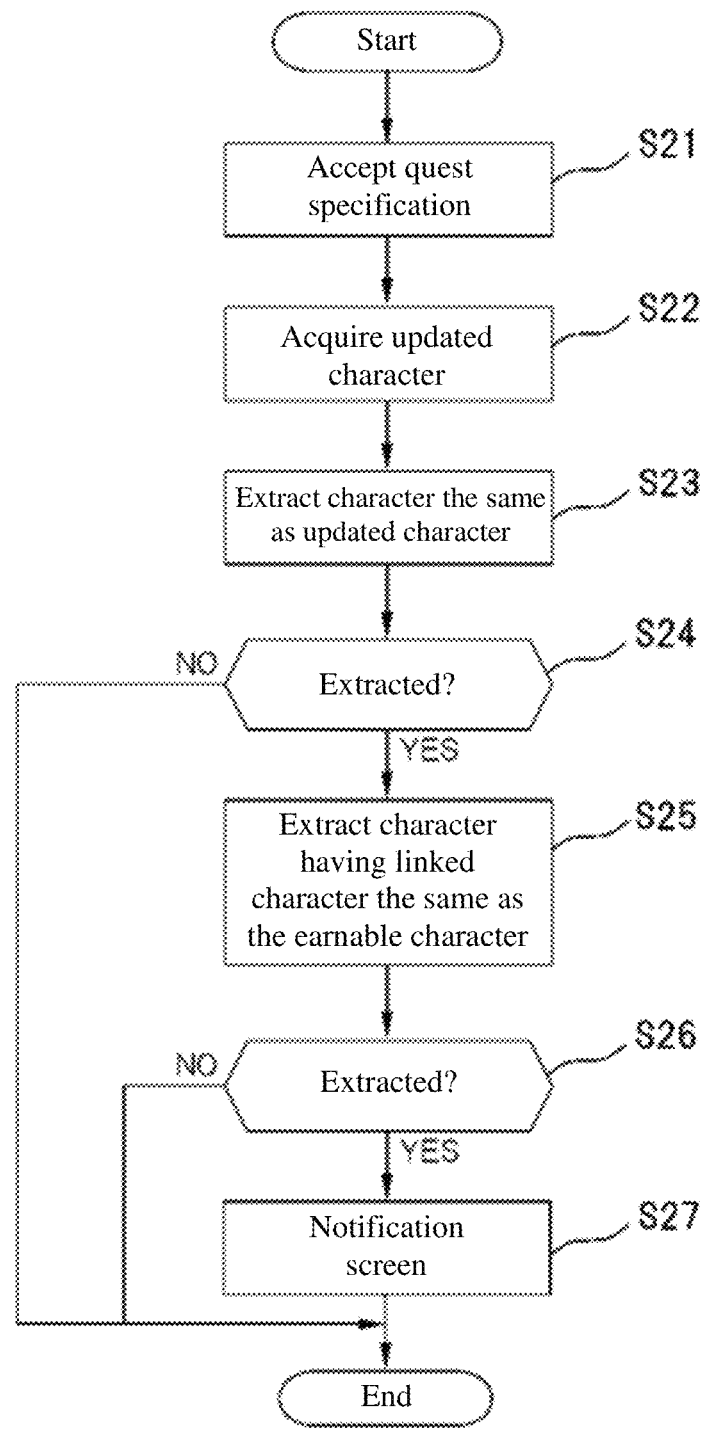
FIG. 10 is a flowchart illustrating the notification processing when a quest is specified in the information processing system according to one or more embodiments of the present invention.

FIG. 10 is a flowchart illustrating the notification processing when a quest is specified in the information processing system 1 according to one or more embodiments.

After the character data has been updated for a character configured in the character information via a version upgrade, the user performs an operation to specify one quest on the client terminal 10 when a specific quest selection screen is displayed on the screen display component 160 of the client terminal 10.

Then, if the user performs an operation to specify a quest when a specific quest selection screen is being displayed, the operation acceptance component 150 of the client terminal 10 accepts the operation particulars based on the quest specified by the user (step S21).

The request transmitter 101 of the client terminal 10 makes a request to the server device 20 on the basis of the operation particulars accepted by the operation acceptance component 150 from the user.

The game progress component 201 of the server device 20 accepts the operation particular from the client terminal 10, and requests that the notification component 203 execute the notification processing upon specifying a quest.

Next, when the execution of notification processing when a quest is specified is requested by the game progress component 201, the notification component 203 of server device 20 refers to the character information stored by the character information storage component 221, and acquires a character whose character data has been updated (updated character) via the current version upgrade, on the basis of the latest update version (step S22).

Next, the notification component 203 of server device 20 refers to the character information and user information, and extracts a character that is the same as the updated character acquired by the above-mentioned processing in step S22 from among the characters possessed by the user (step S23).

In the processing in this step S23, if there is a character that is the same as the linked character of an updated character, it is also extracted from among the characters possessed by the user, rather than extracting only the character that is the same as the acquired updated character.

Next, the notification component 203 of server device 20 determines whether or not a character that is the same as the updated character could be extracted from among the characters possessed by the user (step S24).

If the result of this determination is that a character that is the same as the updated character could not be extracted from among the characters possessed by the user, this processing is ended. On the other hand, if a character that is the same as the updated character could be extracted from among the characters possessed by the user the processing proceeds to the next step S25.

Next, if a character that is the same as the updated character could be extracted, the notification component 203 of server device 20 refers to the quest information stored by the quest information storage component 223 and the character information, and extracts a character having a character that is the same as a character that can be earned with the specified quest for a linked character from among the characters that are the same as the updated character extracted in the above-mentioned processing in step S23 (step S25).

Figures 11, 12:
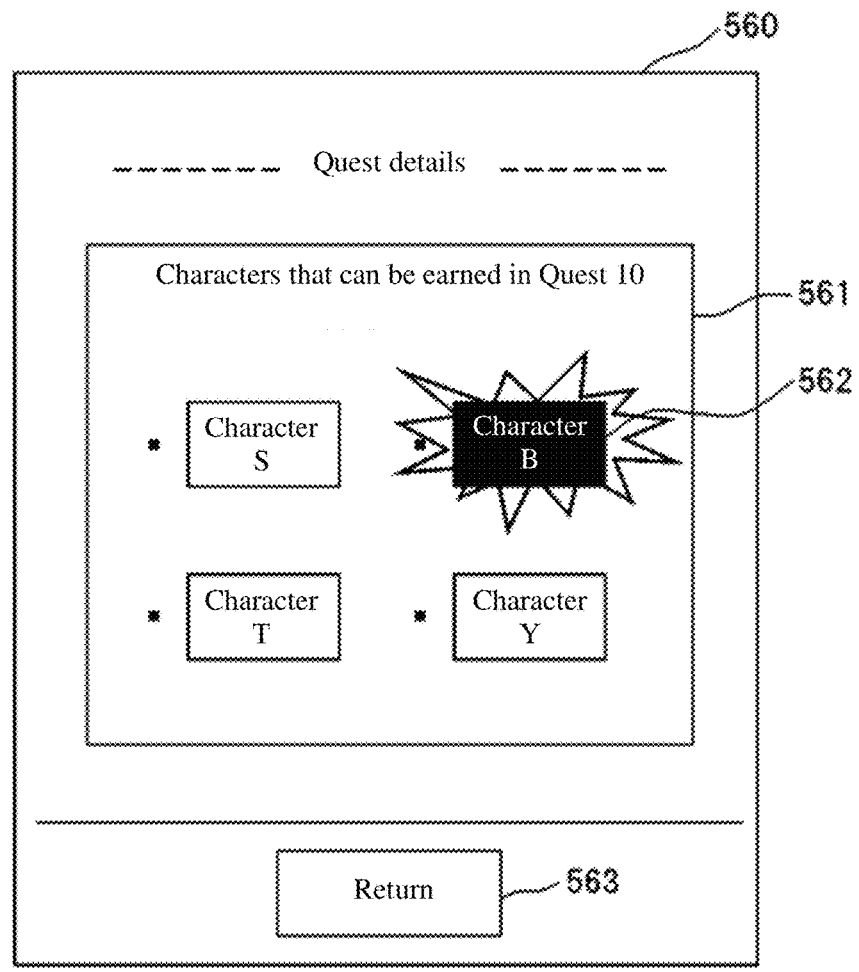
FIG. 11 is a configuration diagram showing an example of quest information according to one or more embodiments of the present invention.
FIG. 12 is a simulation diagram showing an example of a notification screen when a quest is specified according to one or more embodiments of the present invention.

FIG. 11 is a configuration diagram showing an example of quest information. The quest information shown in FIG. 11 includes such items as the quest ID, name, earnable characters, enemy characters, and so forth.

Quest ID is information for uniquely identifying a quest. Name is information indicating the quest name. Earnable Characters is information indicating various kinds of characters that can be earned on the basis of a predetermined probability when that quest has been cleared.

Enemy characters is information indicating the various kinds of characters that appear in that quest. Here, this includes the enemy character that is set to be the boss (main) character, and enemy characters that are set to be sub-characters (other than the boss).

Next, the notification component 203 of the server device 20 determines whether or not a character having a character that is the same as a character that can be earned with a quest for a linked character could be extracted (step S26).

If the result of this determination is that a character having a character that is the same as a character that can be earned with a quest for a linked character could not be extracted, this processing is ended. On the other hand, if a character having a character that is the same as a character that can be earned with a quest for a linked character could be extracted, the processing proceeds to the next step S27.

Next, if the determination in the processing in step S26 is affirmative, the notification component 203 of the server device 20 sends the user a notification that character data has been updated for the character possessed by the user (step S27).

In one or more embodiments, a notification is sent by a notification screen as shown in FIG. 12. Accordingly, when the notification component 203 requests the execution of screen display control, the display controller 204 performs control to display a notification screen on the screen display component 160 of the client terminal 10.

FIG. 12 is a simulation diagram showing an example of a notification screen for when a quest is specified. An earnable character display area 561, a special button 562, and an operation button 563 for returning to a specific quest selection screen are displayed on this notification screen 560 when a quest is specified.

Characters that can be earned with a quest specified by the user ("character B," "character S," "character T," and "character Y") are displayed on the basis of the quest information in the earnable character display area 561.

Also, in the earnable character display area 561, of these earnable characters, those characters that also correspond to a linked character of a character extracted in the processing in step S25 (that is, characters that are the same as a linked character of an updated character and that are possessed by the user) are displayed highlighted by using the special button 562.

That is, on this notification screen 560, the user is notified about the link between the character extracted in the processing in step S25 and the characters that can be earned with a quest.

Then, when the user presses the special button 562, the display changes from the notification screen 560 to the notification screen 550 shown in FIG. 9. On the notification screen 550 in this case, the character extracted in the processing in step S25 is displayed in the base character display area 553, and a linked character of the character extracted in the processing in step S25 out of the earnable characters (that is, a character that is the same as the linked character of the updated character and that is possessed by the user) is displayed in the raw material character display area 554.

That is, on this notification screen 550, the user is notified in more specific terms about the link between the character extracted in the processing in step S25 and the character that can be earned with a quest.

Notification Upon Earning a Character

Figure 13:
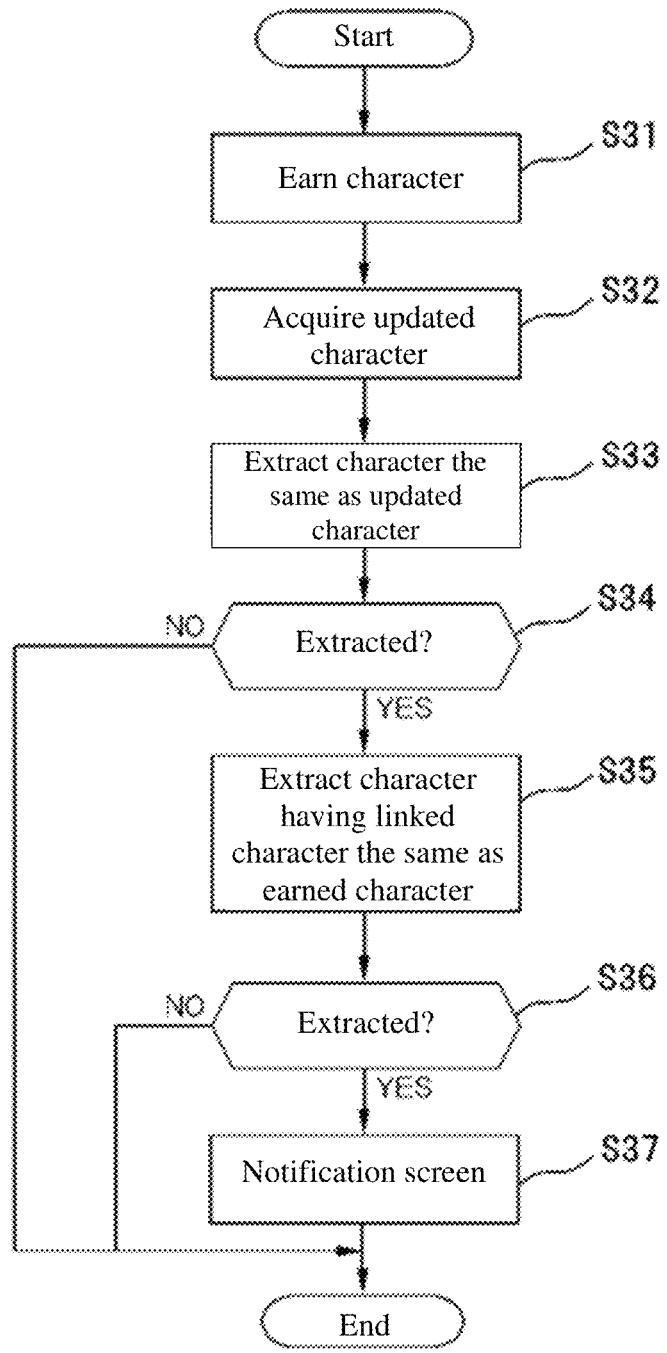
FIG. 13 is a flowchart illustrating notification processing when a character is earned in the information processing system according to one or more embodiments of the present invention.

FIG. 13 is a flowchart illustrating the notification processing when a character is earned in the information processing system 1 according to one or more embodiments.

After the character data has been updated for a character configured in the character information via a version upgrade, the game progress component 201 of the server device 20 allows the user to earn the character granted by the granting component 202 (earned character) once the user clears a quest (step S31).

When the user earns an earned character, the game progress component 201 requests that the notification component 203 execute the notification processing upon earning a character.

Next, when the execution of notification processing when a character is earned is requested by the game progress component 201, the notification component 203 of server device 20 refers to the character information stored by the character information storage component 221, and acquires a character whose character data has been updated (updated character) via the current version upgrade, on the basis of the latest update version (step S32).

Next, the notification component 203 of server device 20 refers to the character information and user information, and extracts a character that is the same as the updated character acquired by the above-mentioned processing in step S32 from among the characters possessed by the user (step S33).

In the processing in this step S33, if there is a character that is the same as the linked character of an updated character, it is also extracted from among the characters possessed by the user, rather than extracting only the character that is the same as the acquired updated character.

Next, the notification component 203 of server device 20 determines whether or not a character that is the same as the updated character could be extracted from among the characters possessed by the user (step S34).

If the result of this determination is that a character that is the same as the updated character could not be extracted from among the characters possessed by the user, this processing is ended. On the other hand, if a character that is the same as the updated character could be extracted from among the characters possessed by the user the processing proceeds to the next step S35.

Next, if a character that is the same as the updated character could be extracted, the notification component 203 of server device 20 refers to the character information and the user information, and extracts a character having a character that is the same as the earned character for a linked character from among the characters that are the same as the updated character extracted by the above-mentioned processing in step S33 (step S35).

Next, the notification component 203 of server device 20 determines whether or not a character having a linked character that is the same character as the earned character could be extracted (step S36).

If the result of this determination is that a character having a character that is the same as the earned character for a linked character could not be extracted, this processing is ended. On the other hand, if a character having a character that is the same as the earned character for a linked character could be extracted, the processing proceeds to the next step S37.

Next, if the determination in the processing in step S36 is affirmative, the notification component 203 of the server device 20 sends the user a notification that character data has been updated for the character possessed by the user (step S37).

Figure 14:
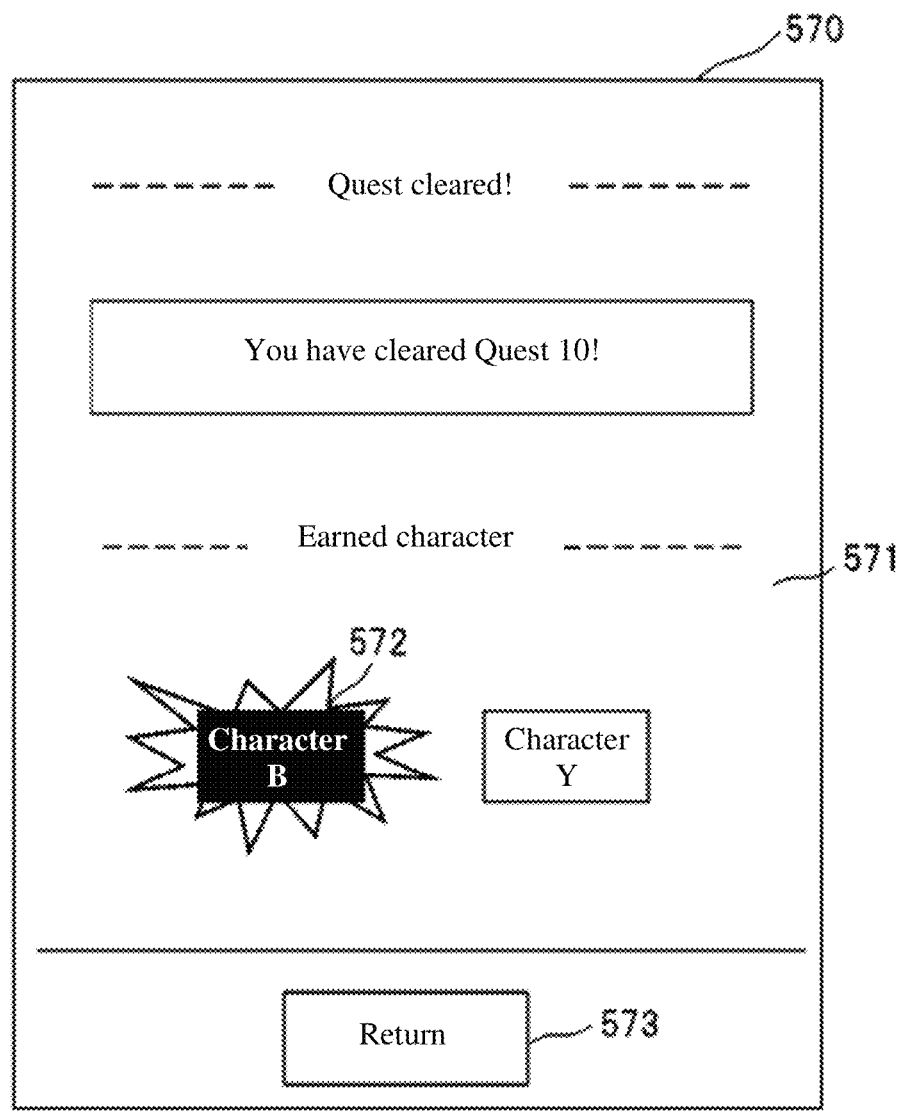
FIG. 14 is a simulation diagram showing an example of a notification screen when a character is earned according to one or more embodiments of the present invention.

In one or more embodiments, a notification is sent by a notification screen as shown in FIG. 14. Accordingly, when the notification component 203 requests the execution of screen display control, the display controller 204 performs control to display a notification screen on the screen display component 160 of the client terminal 10.

FIG. 14 is a simulation diagram showing an example of a notification screen for when a character is earned. An earned character display area 571, a special button 572, and an operation button 573 for returning to the initial screen are displayed on this notification screen 570 when this character is earned.

Earned characters that have been earned by the user ("character B" and "character Y") are displayed out of the earnable characters configured in the quest information.

Also, in the earned character display area 571, of these earned characters, those characters that also correspond to a linked character of a character extracted in the processing in step S35 (that is, characters that are the same as a linked character of an updated character and that are possessed by the user) are displayed highlighted by using the special button 572.

That is, on the notification screen 570, the user is notified about the link between the character extracted in the processing in step S35 and the character granted by the granting component 202 (earned character).

Then, when the user presses the special button 572, the display changes from the notification screen 570 to the notification screen 550 shown in FIG. 9. On the notification screen 550 in this case, the character extracted in the processing in step S35 is displayed in the base character display area 553, and a linked character of the character extracted in the processing in step S35 out of the earned characters (that is, a character that is the same as the linked character of the updated character and that is possessed by the user) is displayed in the raw material character display area 554.

That is, on this notification screen 550, the user is notified in more specific terms about the link between the character extracted in the processing in step S35 and the character granted by the granting component 202 (earned character).

Conclusion

As described above, with the information processing system 1 according to one or more embodiments, a notification of the particulars of character data updates related to the characters possessed by the user is set to match the timing at which the user performs a game operation, the timing at which the user has earned a character, or the timing at which the user has specified a quest, after character data of a character configured in the character information has been updated via a version upgrade. Consequently, the user is able to easily ascertain how the character data has been updated and for which characters, from among the characters possessed by the user.

The above embodiments are intended to facilitate an understanding of the present invention, and are not to be construed as limiting the present invention. One or more embodiments of the present invention, without departing from the gist thereof, also encompass modifications and improvements, as well as equivalents thereof. For example, one or more embodiments of another example of the present invention will be described below.

Fusion Game

In one or more embodiments, an example was given of a fusion game in which all the linked characters that have previously been linked with the base character are combined as raw material characters, and the base character is thereby changed to an evolved character, but one or more embodiments of the present invention are not limited to this.

For example, rather than combining raw material characters with the base character, a fusion game may be executed by combining all linked characters that have been linked with one another to generate a new character (produced character).

In this case, for example, after a "produced character" (character data of a certain character) has been added by update via a version upgrade, and the user has performed a game operation, the notification component 203 may extract characters that are the same as the linked characters required to produce the added "produced character," and the user is notified that the character data has been updated for the extracted same characters.

Display of Game Events

In the above one or more embodiments, the user may be notified of a game event in which a specified character can be easily earned by having the user perform a specification operation of characters whose display is grayed out on the notification screen (that is, special characters or linked characters that could not be extracted because they are not in the user's possession). For example, the user may be notified that a "quest" in which the specified character can be earned is a game event, or the user may be notified that a "lottery game" in which the specified character can be earned by lottery is a game event. This allows the user to easily ascertain game events in which the specified character can be earned.

Series Character

In the above one or more embodiments, the notification component 203 may extract a character that is the same as the first evolved character (series character) from among the characters possessed by the user when the user has performed a game operation after the "evolved character" (character data for a certain character) has been updated via a version upgrade and a second evolved character newly added, and the user may be notified about the link between this extracted same character, the added second evolved character, and the certain character that was evolved.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 first information processing system,
10 client terminal,
20 server device,
50 computer,
51 CPU,
52 RAM,
53 ROM,
54 communication interface,
55 input device,
56 display device,
57 external interface,
58 HDD,
100 client controller,
101 request transmitter,
102 response receiver,
120 client storage component,
140 client communication component,
150 operation acceptance component,
160 screen display component,
200 server controller,
201 game progress component,
202 granting component,
203 notification component,
204 display controller,
220 server storage component,
221 character information storage component,
222 user information storage component,
223 quest information storage component,
240 server communication component,
500 notification screen,
501 notification content display area,
502 character display area,
503 base character display area,
504 raw material character display area,
505 operation button,
506 operation button,
550 notification screen,
551 notification content display area,
552 character display area, 553 base character display area,
554 raw material character display area,
555 operation button,
556 operation button,
560 notification screen,
561 earnable character display area,
562 special button,
563 operation button,
570 notification screen,
571 earned character display area,
572 special button,
573 operation button, B bus line, N network

What is claimed is:

1. An information processing device, comprising:
a memory that stores character data of a possessed character owned by a user;
a receiver that receives a game operation for evolution of the possessed character from the user; and
a processor connected to the memory and the receiver and that adds, based on an update operation by an administrator, new character data of an evolved character of a character to the memory, wherein
after the new character data is added by the administrator, the processor determines whether the character that can be evolved into the evolved character from the added new character data is a same as the possessed character,
the processor causes a display to display, to the user, a screen in which the user selects the character that can be evolved into the evolved character, based on the game operation for evolution, and
upon determining that the character that can be evolved into the evolved character is the same as the possessed character and without selecting the character that can be evolved into the evolved character, the processor causes the display to display a notification on the screen based on the added new character data indicating that the possessed character can be evolved into the evolved character from the added new character data.

2. The information processing device according to claim 1, wherein the display displays the notification and an area that switches to a display indicating parameter details for the evolved character.

3. An information processing method that causes a computer to execute a program, the method comprising:
storing, with a memory character data of a possessed character owned by a user;
receiving, with a receiver, a game operation for evolution of the possessed character from the user;
adding, with a processor and based on an update operation by an administrator, new character data of an evolved character of a character to the memory;
after the new character data is added by the administrator, whether the character that can be evolved into the evolved character from the added new character data is a same as the possessed character,
causing, with the processor, a display to display, to the user, a screen in which the user selects the character that can be evolved into the evolved character, based on the game operation for evolution, and
upon determining that the character that can be evolved into the evolved character is the same as the possessed character and without selecting the character that can be evolved into the evolved character, and causing, with the processor, the display to display a notification on the screen based on the added new character data indicating that the possessed character can be evolved into the evolved character from the added new character data.

4. An information processing device, comprising:
a memory that stores character data of a possessed character owned by a user;
a receiver that receives a game operation for evolution of the possessed character from the user; and
a processor connected to the memory and the receiver and that adds, based on an update operation by an administrator, new character data of an evolved character of a character to the memory, wherein
after the new character data is added by the administrator, the processor determines whether the character that can be evolved into the evolved character from the added new character data is a same as the possessed character,
the processor causes a display to display, to the user, a screen in which the user selects the character that can be evolved into the evolved character, based on the game operation for evolution, and
upon determining that the character that can be evolved into the evolved character is the same as the possessed character and without selecting the character that can be evolved into the evolved character, the processor causes the display to display a notification on the screen based on the added new character data indicating that the evolved character has been added as a game character to be owned by the user.

5. The information processing device according to claim 4, wherein the display displays the notification and an area that switches to a display indicating parameter details for the evolved character.

6. An information processing device, comprising:
a memory that stores character data of a possessed character owned by a user;
a receiver that receives a game operation for evolution of the possessed character from the user; and
a processor connected to the memory and the receiver and that adds, based on an update operation by an administrator, new character data of an evolved character of a first character that belongs to a same series as a second character, to the memory, wherein
after the new character data is added by the administrator, whether the second character that belongs to the same series as the first character that can be evolved into the evolved character from the added new character data is a same as the possessed character,
the processor causes a display to display, to the user, a screen in which the user selects a character that can be evolved, based on the game operation for evolution, and
upon determining that the second character that belongs to the same series as the first character that can be evolved into the evolved character is the same as the possessed character and without selecting the character that can be evolved, the processor causes the display to display a notification on the screen based on the added new character data indicating that the evolved character has been added as a game character to be owned by the user.

* * * * *